No. 640,978. Patented Jan. 9, 1900.
W. R. VAN VLIET.
FRUIT BASKET MACHINE.
(Application filed Feb. 3, 1897.)

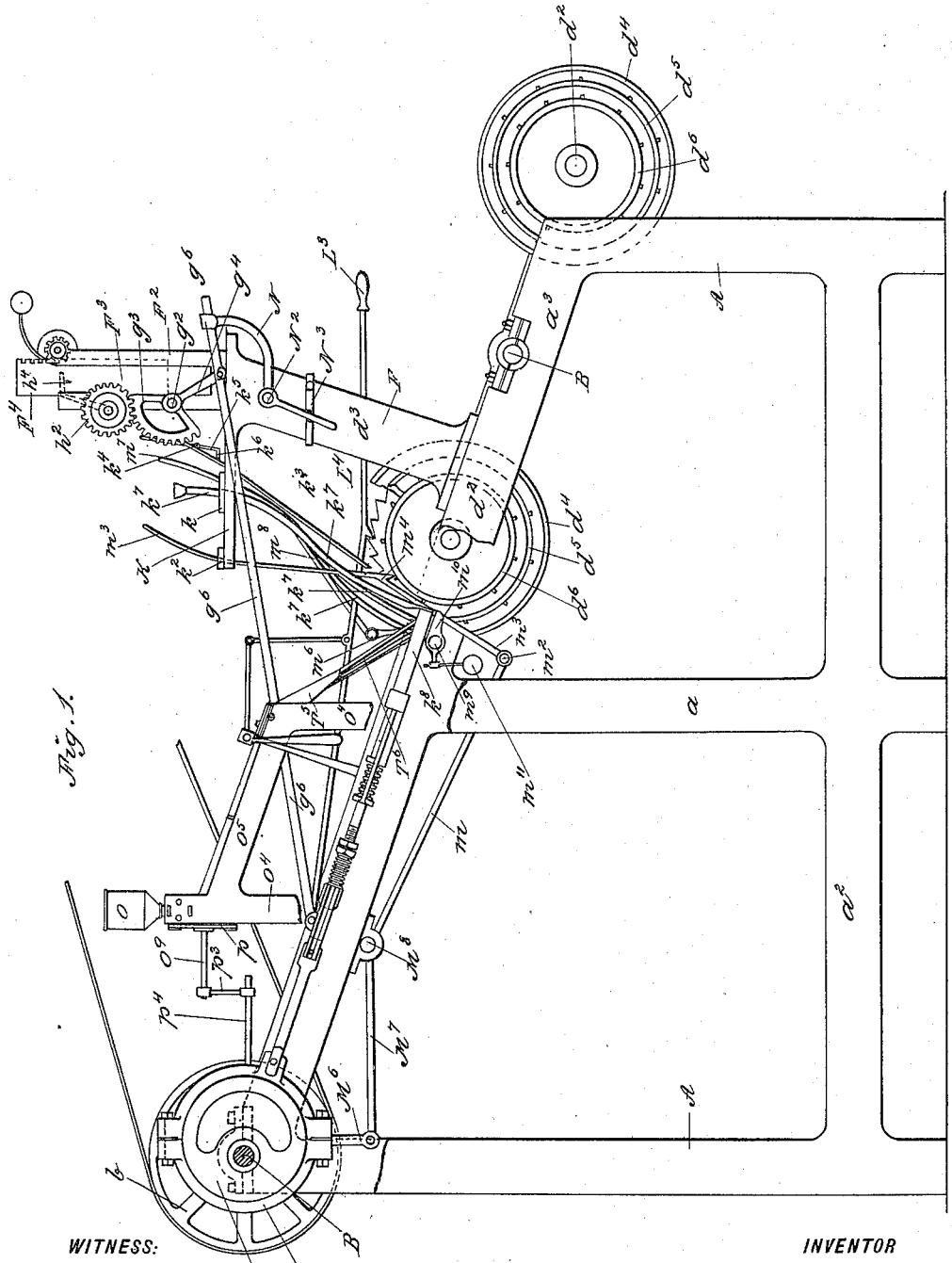

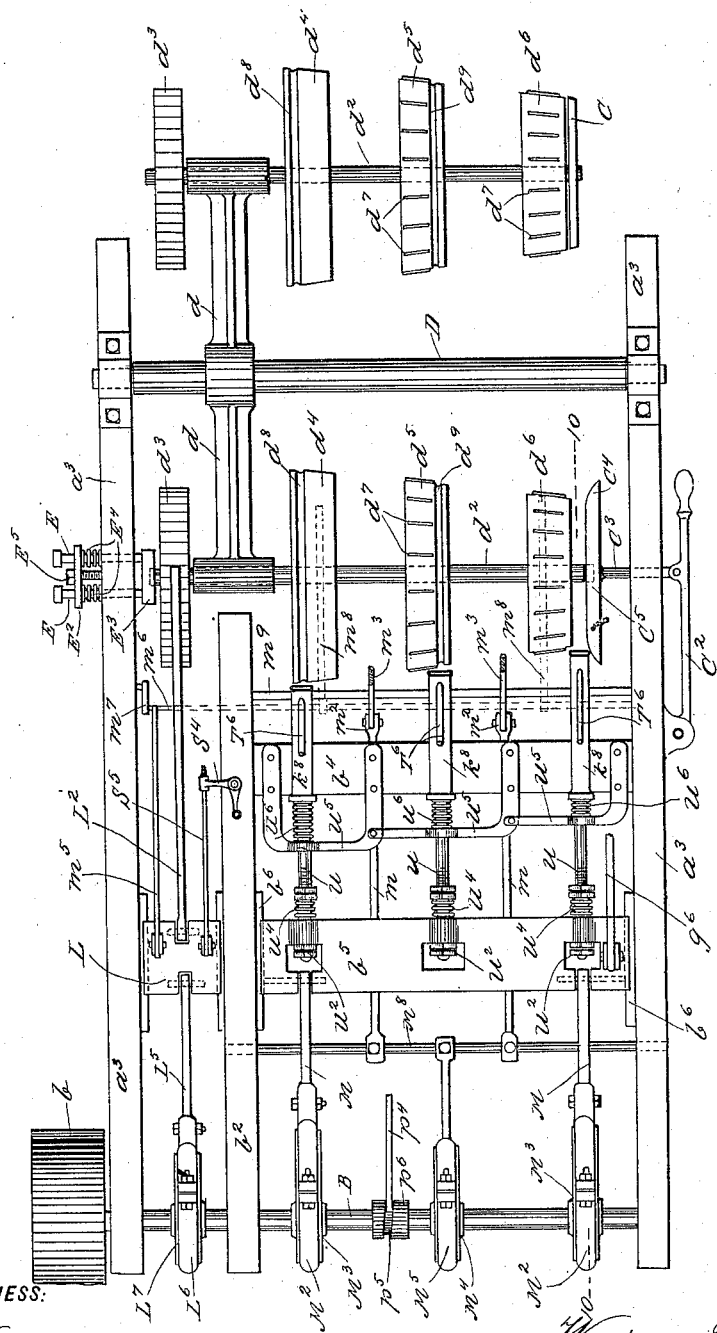

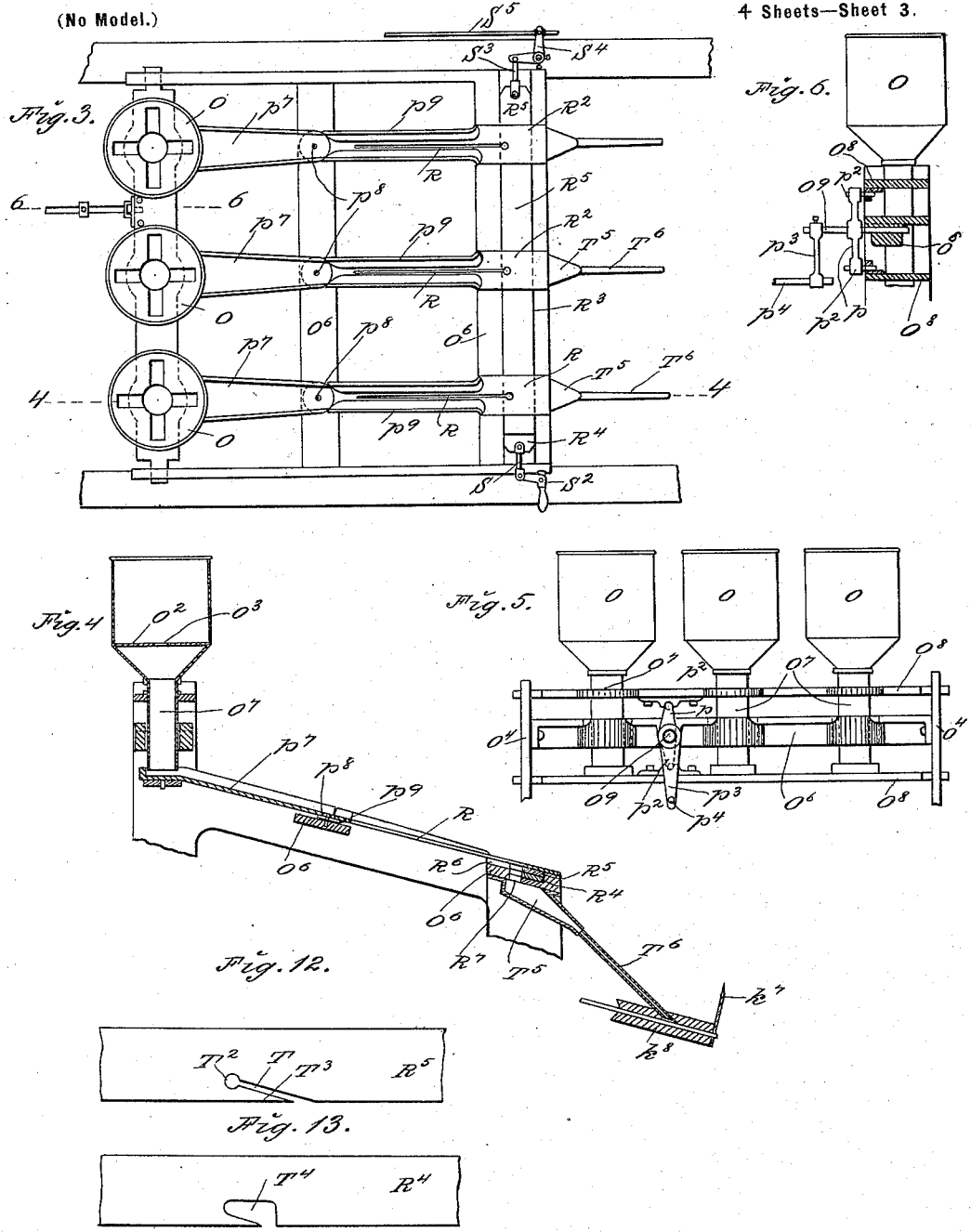

(No Model.) 4 Sheets—Sheet 4.

WITNESS:
C. Nordfor
S. D. Hawkshurst

INVENTOR
Warren R. Van Vliet
BY
Edgar Tate & Co.
ATTORNEYS

THE NORRIS PETERS CO., PHOTO-LITHO., WASHINGTON, D. C.

UNITED STATES PATENT OFFICE.

WARREN RENSALAER VAN VLIET, OF EAST STROUDSBURG, PENNSYLVANIA.

FRUIT-BASKET MACHINE.

SPECIFICATION forming part of Letters Patent No. 640,978, dated January 9, 1900.

Application filed February 3, 1897. Serial No. 621,825. (No model.)

*To all whom it may concern:*

Be it known that I, WARREN RENSALAER VAN VLIET, a citizen of the United States, and a resident of East Stroudsburg, in the county of Monroe and State of Pennsylvania, have invented certain new and useful Improvements in Fruit-Basket Machines, of which the following is a specification, reference being had to the accompanying drawings, forming a part thereof, in which similar letters of reference indicate corresponding parts.

This invention relates to machines for making fruit-baskets and similar articles; and one object thereof is to provide a machine for this purpose which is automatic in operation and which is designed to make baskets which are substantially cylindrical, but slightly conical, in form, a further object being to provide a machine of this class which is provided with suitable hoppers or carriers for the staves of which the baskets are composed and also for nails, by which the separate parts of the basket are secured together, and suitable feeding-tubes for the hoops by which the staves are secured together, and operative mechanism for feeding said staves and said hoops into proper position to form a basket and for feeding the nails into position and for driving them through said hoops and said staves.

The invention is fully disclosed in the following specification, of which the accompanying drawings form a part, in which—

Figure 7:
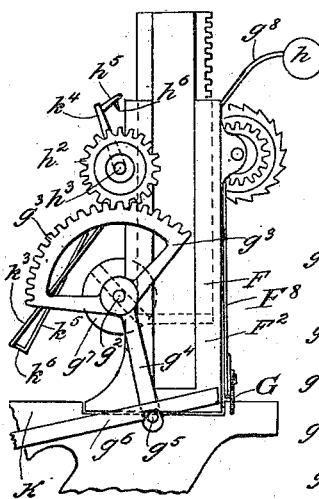
Figures 8, 9:
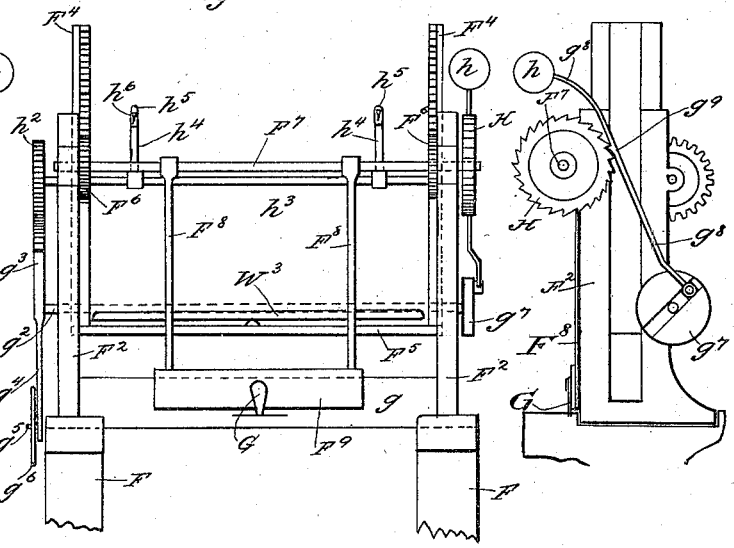
Figure 10:
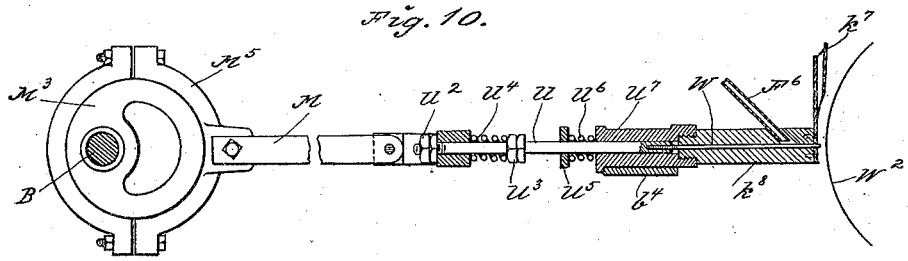
Figure 11:
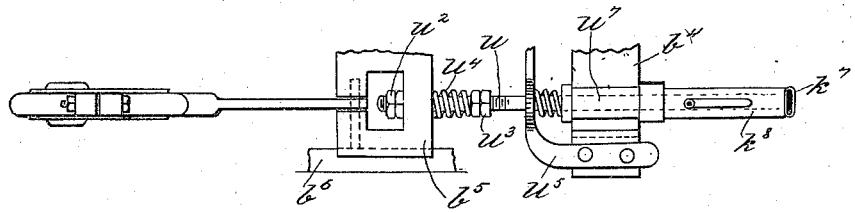

Figure 1 is a partial side view of my improved machine, parts thereof being broken away to better show the construction; Fig. 2, a partial plan view thereof, a part of the operative mechanism being removed, so as to better show certain features thereof; Fig. 3, a plan view of the nail-hoppers and the operative mechanism connected therewith; Fig. 4, a section on the line 4 4 of Fig. 3; Fig. 5, a rear end view of the nail-hoppers and the operative mechanism connected therewith, as shown in Fig. 3; Fig. 6, a section on the line 6 6 of Fig. 3; Fig. 7, a side view of the stave-hopper; Fig. 8, a front view thereof; Fig. 9, a side view of the stave-hopper opposite to that of Fig. 7; Fig. 10, a partial section on the line 10 10 of Fig. 2; Fig. 11, a side view of the construction shown in Fig. 10; Fig. 12, a plan view of a needle-bar which is employed for properly placing the nails, and Fig. 13 a stop-bar which is used in connection therewith.

In the practice of my invention I provide a suitable frame, one side of which is shown in Fig. 1, and which consists of vertical end posts A, a central vertical post $a$, the end posts and the middle posts being united at the bottom by a longitudinal bar $a^2$, and a top bar $a^3$, and the separate sides are united by suitable cross plates or bars, which are designed to give stability and strength to the machine. The top bars $a^3$ are inclined upwardly and backwardly, as clearly shown in Fig. 1, and mounted at the rear ends thereof is a power-shaft B, on one end of which is mounted a power wheel or pulley $b$, and I also provide a supplemental frame consisting of a longitudinal bar $b^2$, one end of which is mounted on the shaft B and near the forward end of which is a cross plate or bar $b^4$, which is rigidly secured thereto and to one of the side bars $a^3$ of the frame.

Mounted between one of the side bars $a^3$ and the bar $b^2$ of the supplemental frame and adjacent to the rear ends thereof is a sliding cross-head $b^5$, and said sliding cross-head is provided with guides $b^6$, which are secured to the bars $a^3$ and $b^2$, between which said sliding cross-head is located and which serve to guide said cross-head in its movement back and forth in the operation of the machine, as hereinafter described. These features of the construction are best shown in Fig. 2, and mounted between the ends of the side bars $a^3$ of the frame opposite the shaft B is a shaft D, which is provided with a cross-head $d$, which carries at its opposite end forms, which consist of a shaft $d^2$ on one end of which is a ratchet-wheel $d^3$, and on which are also mounted three circular heads $d^4$, $d^5$, and $d^6$, which constitute the forms proper. The circular heads $d^4$, $d^5$, and $d^6$ decrease in size outwardly in the order named, and the last two, $d^5$ and $d^6$, are provided with transverse ribs or flanges $d^7$ on their perimeters, by means of which said perimeters are divided into equal spaces, and these ribs or flanges are preferably eleven in number, and formed on the perimeter of the head $d^4$ adjacent to the inner side thereof is an annular groove $d^8$, and a similar annular groove $d^9$ is formed on the intermediate head $d^5$ adjacent to its outer side, and the end of the shaft $d^2$ opposite the ratchet-wheel $d^3$ is adapted to receive a circular wooden disk or plate C, which is designed to form the bottom of the basket.

Pivotally connected with one of the side bars $a^3$ is a lever $C^2$, which is pivotally connected with a shaft $C^3$, which passes through said side bars $a^3$ and which carries at its inner end a disk $C^4$, the inner surface of which is convex or the inner edges thereof beveled or rounded, and formed centrally in the inner surface of said disk is a cavity or recess $C^5$, which is shown in dotted lines in Fig. 2 and which is adapted to receive the end of the shaft $d^2$, and passing through the opposite bar $a^3$ of the frame are two bolts E, which are connected by a cross-plate $E^2$ and which pass through the side bar $a^3$, with which they are connected, and are provided at their inner ends with a cross-head $E^3$, which is adapted to bear upon the adjacent end of the shaft $d^2$, and between the cross-head $E^2$ and the bar $a^3$ are spiral springs $E^4$, and passing through said cross-head $E^2$ and into the bar $a^3$ is a screw-threaded bolt $E^5$, which is adapted to regulate the position of said bolts E and the pressure thereof upon the shaft $d^2$, and it will be understood that the cross-head $d$ is free to revolve on the shaft D, or said shaft itself may revolve so as to change the position of the forms whenever desired.

Mounted above the frame and connected with the side bars $a^3$ by means of upright and slightly-inclined standards F is a stave-hopper which consists of vertical standards $F^2$, which are secured to or mounted on the uprights F and which are provided with vertical slots $F^3$, which are open at their upper ends, in which are placed vertically-movable rack-bars $F^4$, which are connected at their lower ends by a cross-plate $F^5$ and which are adapted to be operated by pinions $F^6$, mounted on a shaft $F^7$, to which are secured depending rods or arms $F^8$, which are connected at their lower ends by a cross-plate $F^9$, and the rods or bars $F^8$ and the cross-plate $F^9$ constitute a frame by means of which the staves are held in position, and said frame is adapted to be held or retained in the desired position by a spring-catch G, which is secured to a cross-plate $g$.

Mounted transversely of the standards $F^2$, at the back and near the bottom thereof, is a shaft $g^2$, on one end of which is mounted a segmental gear $g^3$, which is provided with an arm $g^4$, which is provided at its lower end with a crank $g^5$, which is adapted to operate in a notch or recess formed in a rod $g^6$, which extends backwardly and pivotally connected with the cross-head $b^5$, and the opposite end of said shaft $g^2$ is provided with a disk $g^7$, which is best shown in Fig. 9 and with which is eccentrically secured a pawl-rod $g^8$, which is provided with a sprocket $g^9$, which is adapted to operate in connection with a ratchet-wheel H, which is mounted on the shaft $F^7$, and said pawl-rod is provided at its upper end with a weight $h$, and the segmental gear $g^3$ is adapted to operate in connection with the gear-wheel pinion $h^2$, which is mounted on the end of a shaft $h^3$, with which are connected picker-arms $h^4$, which are provided with outwardly-directed extensions $h^5$, on which are formed teeth or projections $h^6$.

Formed on the upper ends of the uprights F are backwardly-directed arms K, which are connected by cross-plates $k$ and $k^2$, and passing downwardly between said arms are ways $k^3$, two of which are employed, one at each side, the upper ends of which are connected by a rod $k^4$, on which are mounted a set of fingers $k^5$, which project upwardly and which are adapted to receive the staves, which are delivered thereto by the pickers $h^4$. The lower ends of the fingers $k^5$ are provided with backwardly-directed extensions $k^6$, and the lower ends of the ways $k^3$ terminate slightly above and in front of the circular heads $d^4$, $d^5$, and $d^6$, which constitute the form proper on which the basket is made, and passing through the cross-plate $k$ and secured thereto are three hoop-tubes $k^7$, which extend backwardly and downwardly and each of which is connected with the forward end of one of the driving-tubes $k^8$, three of which are employed, as will hereinafter be described, and the forward side of said hoop-tubes is cut away, as shown in Fig. 10, in order to provide means whereby said hoops may be brought in contact with the staves, as hereinbefore described.

I also employ a sliding cross-head L, which is mounted between the bar $b^2$ of the supplemental frame and the bar $a^3$ of the frame adjacent thereto and which is in line with the sliding cross-head $b^5$, and pivotally connected therewith is a ratchet-arm $L^2$, which projects forwardly and is provided with a handle $L^3$ and with a sprocket or tooth $L^4$, which is adapted to operate in connection with the ratchet-wheel $d^3$, this construction being best shown in Figs. 1 and 2, and pivotally connected with the sliding cross-head L is an eccentric-rod $L^5$, which is connected with an open ring or band $L^6$, mounted on an eccentric $L^7$, which is mounted on the shaft B, and pivotally connected with the sliding cross-head $b^5$, hereinbefore described, are two eccentric-rods M, which are also connected with open rings or bands $M^2$, which are mounted on eccentrics $M^3$, which are also mounted on the shaft B, and mounted on said shaft B, at one side of the central portion, is another eccentric $M^4$, on which is mounted an open ring or band $M^5$, to which is secured a depending arm $M^6$, which is pivotally connected with a lever $M^7$, which is connected with a rod $M^8$, to which are secured two forwardly-directed rods $m$, each of which is pivotally connected at $m^2$ with an upwardly-directed angular arm $m^3$, each of which is provided centrally with a hook or tooth $m^4$, and the object of these arms is to place and hold in position the staves while being nailed.

Pivotally connected with the sliding cross-head L is a rod $m^5$, which extends forwardly and is connected with a rod $m^6$, which is connected with a crank-lever $m^7$, which is connected with one of the side bars $a^3$ of the main frame, and said rod $m^5$ is adapted to give the cross-rod $m^6$, which extends transversely across the frame, an oscillating movement, and connected with said rod $m^6$ are upwardly and forwardly directed fingers $m^8$, two of which are employed, one of which is shown in full lines in Fig. 1, and both of which are shown in dotted lines in Fig. 2, and which are adapted to guide and control the movement of the staves when passing over the ways $k^3$, and arranged transversely of the frame and between one of the side bars $a^3$ and the bar $b^2$ of the supplemental frame, hereinbefore described, is a transverse rod $m^9$, with which are pivotally connected three levers $m^{10}$, one of which is located beneath each of the driving-tubes $k^8$, and the ends thereof project below the ends of the hoop-tubes $k^7$, and said levers $m^{10}$ are provided with weights $m^{11}$, which are designed to hold them in the proper position, and the object of these levers $m^{10}$ is to stop the downward movement of the hoops at the beginning of the construction of the basket.

Referring to Fig. 1 of the drawings, it will be seen that the outer or forward end of the rod $g^6$, which is connected with the segmental gear $g^3$, is provided with a crank-lever N, which is fulcrumed at $N^2$ and which is adapted to operate in connection with a keeper $N^3$, secured to one of the uprights F, said keeper being provided with a number of notches or recesses, and whenever it is desirable in the operation of the machine to discontinue the feeding of the staves without stopping the machine all that is necessary is to operate said lever so as to raise the rod $g^6$ out of connection with the arm $g^4$ of the segmental gear $g^3$, said rod being provided with a notch or recess in its lower side, which engages with a crank formed on the lower end of said arm $g^4$, as clearly shown in Fig. 7.

Suitably supported above the frame and near the rear end thereof are three hoppers O, which are designed to receive the nails, and said hoppers are provided with diaphragms $O^2$, in the central portion of which are formed openings $O^3$, and said diaphragms are also provided with radial slots which communicate with said central openings, as shown in Fig. 3, said radial slots being adapted to facilitate the feeding of the nails through said central openings in the operation of the machine, as hereinafter described, and said hoppers are supported by a suitable frame mounted on the main frame and which consists of vertical standards $O^4$, side bars $O^5$, and cross-plates or bars $O^6$.

The lower ends of the hoppers O are provided with tubular extensions $O^7$, which pass through one of the cross-bars $O^6$ and which are capable of lateral movement therein, and said extensions $O^7$ also pass through the upper and lower cross-plates $O^8$, which are also capable of longitudinal movement crosswise of the machine, the ends thereof being provided with extensions, which are passed through the upper ends of the rear standards $O^4$, and connected with the rear cross-plate $O^6$ is a rod $O^9$, on which is mounted a cross-head P, which is pivotally connected with the upper and lower cross-plates $O^8$ at $P^2$, and said rod $O^8$ is provided with a crank $P^3$, with which is connected a rod $P^4$, the outer end of which moves in a cam-groove $P^5$, formed in a collar $P^6$, mounted on the shaft B, as shown in Fig. 2, the object of this construction being to give the hoppers a lateral motion as the shaft B is revolved.

The lower ends of each of the tubular extensions $O^7$ of the hoppers $O^3$ communicate or connect with chutes $P^7$, into which the nails are fed, the oscillating or lateral movement of the hoppers being adapted to feed the nails through the diaphragms $O^4$ and downwardly through the extensions $O^7$ and into said chutes, and the chutes $P^7$ are pivotally connected with one of the cross-bars $O^6$, as shown at $P^8$, and the chutes $P^7$ are provided with stationary extensions $P^9$, the side walls of which are inwardly curved, as shown in Fig. 3, and said stationary extensions $P^9$ are provided with longitudinal slots R, through which the pointed ends of the nails drop as they pass through said extensions, and said nails are fed downwardly through said slots, and the lower ends of said extensions are provided with heads $R^2$, which are secured to the forward cross-plate $O^6$ of the frame on which the hoppers are mounted, and said cross-plate $O^6$ is provided centrally with a slot $R^3$, in the bottom of which is mounted a stop-bar $R^4$, over which is placed a needle-bar $R^5$, and the cross-bar $O^6$ is provided immediately beneath the slots R with transverse grooves $R^6$, which communicate with the groove $R^3$, in which the needle-bar and the stop-bar are placed, and said groove $R^3$ extends longitudinally through the plate $R^6$, at the rear portion thereof, as shown at $R^7$ in Fig. 4.

Secured to one end of the stop-bar $R^4$ is a rod S, to which is secured a crank-lever $S^2$, by means of which said bar may be operated when necessary, and the opposite end of the needle-bar $R^5$ is provided with a rod $S^3$, which is pivotally connected therewith and with a crank-lever $S^4$, which is connected with a rod $S^5$, which is connected with the sliding cross-head L, these features of the construction being best shown in Figs. 3 and 4.

In the operation of the machine the needle-bar $R^5$ is constantly moved back and forth at each revolution of the shaft B, and said needle-bar is provided at one side thereof with an inwardly-directed inclined slot T, which communicates with a circular opening $T^2$, by means of which a prong $T^3$ is formed, and at each movement of said bar a nail is picked from the slot R in the extension $P^9$ of the chute $P^7$, and said nail passes along the slot T until it reaches the opening $T^2$, when it drops through an opening $T^4$ in the bar $R^4$ and into a chute $T^5$, provided with a tubular extension $T^6$, one of which connects with each of the driving-tubes $k^8$ and with a central bore or passage formed therein, as clearly shown in Figs. 4 and 10. When the nails enter the driving-tubes $k^8$, they are in position to be operated upon by the driving-pins, which will now be described.

Connected with the sliding cross-head $b^5$ are three driving-rods U, which are best shown in Figs. 2, 10, and 11, and said cross-heads are provided with openings into which said rods project, and said rods are provided with nuts $U^2$, which are mounted thereon in said openings, and about midway thereof are other nuts $U^3$, and between the nuts $U^3$ and the cross-head are strong spiral springs $U^4$, and the outer ends of said driving-rods pass through suitable keepers $U^5$, which are connected with the cross bar or plate $b^4$ of the supplemental frame, and between said keepers and said cross bar or plate are springs $U^6$, and mounted on the outer ends of said driving-rods are tubular heads $U^7$, through which said rods are adapted to pass and into which the driving-tubes $k^8$ are screwed, or said driving-tubes may be connected therewith in any desired manner, and each of the driving-rods U is provided with a driving-pin W, which is secured therein in any desired manner. It will be understood that the driving-pins W may be removed and new ones substituted whenever desired, and the connection with the driving-rods may be made by means of a screw-thread or in any preferred way.

The curved line $W^2$ in Fig. 10 is designed to represent one of the circular heads which constitute the form proper on which the basket is made, and in the operation of feeding the nails, as hereinbefore described, the stop-bar $R^4$ may be so adjusted by means of the crank-lever $D^2$ as to prevent the nails from passing into the slots T of the needle-bar, and thus prevent the feeding of the nails.

The operation will be readily understood from the foregoing description, when taken in connection with the accompanying drawings and the following statement thereof:

It will be understood that the nails, which are very short, are fed through the chute $T^5$ and through the extension $T^6$ point foremost, this being accomplished by means of the slots in the extensions $P^9$ of the chute $P^7$ and by means of the needle-bar, constructed as herein described, and in practice the staves from which the baskets are made are placed in the stave-hopper, and the bottom of said hopper is provided with an equalizer $W^3$, which is pivotally mounted therein and which is designed to keep both ends of the staves at an equal height. It will be understood that the stave-hopper is given an intermittent vertical movement by means of the shaft $g^2$, the disk or wheel $g^7$ mounted thereon, the pawl-lever $g^9$, the ratchet-wheel H, which is mounted on the shaft $F^7$, and the pinions $F^6$, which are mounted on said shaft $F^7$ and which operate in connection with the rack-bars $F^4$, and at each upward movement of the stave-hopper the pickers $h^4$ are operated by the segmental gear $g^3$ and the gear wheel or pinion $h^2$ to deposit a stave on the ways $k^3$, and said stave is moved downwardly over said ways and deposited between the ribs or flanges $d^7$ on the heads $d^5$ and $d^6$ of the forms, and said staves are held in proper position on the forms by the rods or arms $m^3$, hereinbefore described. The nails are fed through the hoppers and through the chutes connected therewith, as hereinbefore described, said hoppers being given a lateral motion by which this result is accomplished, and said nails pass through the tubular extensions $T^6$ of the chutes $T^5$ into the driving-tubes $k^8$, and in passing through the extensions $P^9$ of the chutes $P^7$ the nails are suspended through the slots R by their heads and drop into the chutes $T^5$ point foremost, and when said nails are properly deposited in the driving-tubes $k^8$ the next half-turn of the shaft B will result in said nails being driven into the hoops and staves, it being understood that at the same time that the staves are fed into position, as hereinbefore described, the hoops are passed downwardly into the hoop-tubes $k^7$ into proper position, and this operation is repeated until the basket is entirely formed and the circular heads $d^4$, $d^5$, and $d^6$, which constitute the form proper, being intermittently revolved by means of the ratchet-wheel $d^3$ and the ratchet rod or lever $L^2$ at each movement of the stave-hopper and of the driver, as hereinbefore described. The springs $U^4$ are intended to be strong enough to drive in the nail, and the other springs $U^6$ are designed to let the point of the drive-tubes recede, so as to provide means for lapping over the ends of the hoops and for nailing the same, as will be readily understood. The staves and nails drop to their proper places on the backward movement of the cross-heads, and the staves are picked out of the hopper on the forward movement thereof, and the nails are driven into their places in the hoops and staves on the forward movement of the cross-head $b^5$. The forms which are connected with the shaft D have two movements, one a circular or swinging movement on the shaft D, which may carry two or more of said forms, and said forms proper, which consist of the circular heads $d^4$, $d^5$, and $d^6$, are adapted to move around with the spindles or shafts on which they are mounted, being thus operated by the ratchet-wheel $d^3$ and the arm or lever $L^2$, and the ribs or flanges $d^7$ are designed, as hereinbefore stated, to properly place the staves, and the annular grooves $d^8$ and $d^9$ are designed to clench the nails when driven through the hoops and staves, said nails being driven into said grooves, as will be readily understood, and the circular head $d^6$ is not provided with a groove, but the disk C, which constitutes the bottom of the basket, takes the place thereof, and in this case the nails are driven into said disk, and when one basket has been completed the form on which it is placed is turned and another form brought into position, and this process may be continued as long as desirable.

This machine will make a better basket and one in which the staves are more evenly placed than can be made by hand, the nails being driven straight into the grooves $d^8$ and $d^9$ and clenched, whereby the staves and hoops are held firmly together, and the machine is automatic in operation, all that is necessary being to keep the hoppers properly provided with nails and staves and to have an attendant to operate the form-carrier.

My invention is not limited to the number of forms which are connected with the shaft D, and it is evident that changes in and modifications of the various elements of construction herein shown and described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. In a machine for making baskets, the combination with a suitable frame, of a revoluble form-carrier, and suitable forms connected therewith, a stave-hopper, which is vertically movable, and provided with devices for removing the staves therefrom, and placing them upon the forms, hoop-tubes through which the hoops are fed, nail-hoppers which are adapted to receive nails, and which are provided with means for feeding the same therefrom and into position, to be driven into said hoops and staves, and devices for driving said nails, substantially as shown and described.

2. In a machine for making baskets, the combination with a suitable frame, of a revoluble form-carrier, and suitable forms connected therewith, a stave-hopper, which is vertically movable, and provided with devices for removing the staves therefrom, and placing them upon the forms, hoop-tubes through which the hoops are fed, nail-hoppers which are adapted to receive nails, and which are provided with means for feeding the same therefrom, and into position, to be driven into said hoops and staves, and devices for driving said nails, said forms being composed of circular heads, which are mounted on a revoluble shaft, and which are provided with spacing ribs or flanges, between which the staves are placed, substantially as shown and described.

3. In a machine for making baskets, the combination with a suitable frame, of a revoluble form-carrier, and suitable forms connected therewith, a stave-hopper which is vertically movable, and provided with devices for removing the staves therefrom, and placing them upon the forms, hoop-tubes through which the hoops are fed, nail-hoppers which are adapted to receive nails, and which are provided with means for feeding the same therefrom, and into position to be driven into said hoops and staves, and devices for driving said nails, said forms being composed of circular heads, which are mounted on a revoluble shaft, and which are provided with spacing ribs or flanges, between which the staves are placed, and said heads being also provided with annular grooves into which the nails are driven, and by which they are clenched, substantially as shown and described.

4. In a machine for making baskets, the combination with a suitable frame, of a revoluble form-carrier, and suitable forms connected therewith, a stave-hopper which is vertically movable, and provided with devices for removing the staves therefrom, and placing them upon the forms, hoop-tubes through which the hoops are fed, nail-hoppers which are adapted to receive nails, and which are provided with means for feeding the same therefrom, and into position, to be driven into said hoops and staves, and devices for driving said nails, said forms being composed of circular heads, which are mounted on a revoluble shaft, and which are provided with spacing ribs or flanges, between which the staves are placed, and said heads being also provided with annular grooves into which the nails are driven, and by which they are clenched, and the shaft on which the heads are mounted, being adapted to receive at one end, a disk or plate which constitutes the bottom of the basket, and into which nails are also driven, substantially as shown and described.

5. A machine for making baskets, comprising a suitable frame, a revoluble shaft mounted therein, forms connected with said shaft, devices for giving said shaft intermittent motion, a stave-hopper mounted on said frame, devices connected with said hopper, and said frame for placing the staves in position in said forms, devices for supplying hoops to the forms, nail-hoppers suitably supported on said frame, and provided with perforated diaphragms, and devices connected with said hoppers and with said frame for feeding said nails into position, to be driven into said hoops and staves, consisting of driving-rods which are in operative connection with the power-shaft of the machine, and with a sliding cross-head mounted thereon, and driving-rods provided with driving-pins which operate in connection with driving-tubes into which the nails are fed, substantially as shown and described.

6. A machine for making baskets comprising a suitable frame, a revoluble shaft mounted therein, forms connected with said shaft, devices for giving said shaft intermittent motion, a stave-hopper mounted on said frame, devices connected with said hopper and said frame for placing the staves in position on said forms, nail-hoppers suitably supported on said frame, and provided with centrally perforated and slotted diaphragms in which are formed radial slots communicating with said central perforations or partitions, and devices connected therewith and with said frame, for feeding said nails into position to be driven into said hoops and staves, substantially as shown and described.

7. In a machine for making baskets, the combination with a suitable frame, of a revoluble form-carrier, revoluble shafts connected therewith, and provided with suitable forms, a ratchet-wheel mounted on said shafts, and means for giving the same an intermittent motion, a suitable stave-hopper, and means for giving the same a vertical intermittent motion, devices connected with said stave-hopper for removing the staves therefrom, and placing them on the forms, hoop-tubes through which the hoops are passed, nail-hoppers suitably mounted on said frame, and provided with chutes through which the nails are fed, and means for giving said hoppers an oscillating or lateral motion, and devices for removing the nails, one at a time, from said chutes, and depositing them in a driving-tube, and driving-rods connected with a sliding cross-head which is operated by eccentrics mounted on the power-shaft, said driving-rods being provided with driving-pins which pass through said driving-tubes, and by which the nails are driven through the hoops and staves, substantially as shown and described.

8. In a machine for making baskets, the combination with a suitable frame, of a revoluble form-carrier, revoluble shafts connected therewith, and provided with suitable forms, a ratchet-wheel mounted on said shafts, and means for giving the same an intermittent motion, a suitable stave-hopper, and means for giving the same a vertical intermittent motion, devices connected with said stave-hopper for removing the staves therefrom, and placing them on the frames, hoop-tubes through which the hoops are passed, nail-hoppers suitably mounted on said frame, and provided with chutes through which the nails are fed, and means for giving said hoppers an oscillating or lateral motion, and devices for removing the nails, one at a time, from said chutes, and depositing them in a driving-tube, and driving-rods connected with a sliding cross-head which is operated by eccentrics mounted on the power-shaft, said driving-rods being provided with driving-pins which pass through said driving-tubes, and by which the nails are driven through the hoops and staves, said forms being composed of circular heads having spacing ribs or flanges between which the staves are placed, and being also provided with annular grooves into which the nails are driven, and the shaft on which said heads are placed, being adapted to receive a disk or plate which constitutes the bottom of the basket, and into which nails are also driven, and means connected with the power-shaft for holding said staves into position on said forms, while the nails are being driven through the hoops and staves, substantially as shown and described.

9. In a machine for making baskets, the combination with a suitable frame, of a revoluble form-carrier, revoluble shafts connected therewith, and provided with suitable forms, a ratchet-wheel mounted on said shafts, and means for giving the same an intermittent motion, a suitable stave-hopper, and means for giving the same a vertical intermittent motion, devices connected with said stave-hopper for removing the staves therefrom, and placing them on the frames, hoop-tubes through which the hoops are passed, nail-hoppers suitably mounted on said frame, and provided with chutes through which the nails are fed, and means for giving said hoppers an oscillating or lateral motion, and devices for removing the nails, one at a time, from said chutes, and depositing them in a driving-tube, and driving-rods connected with a sliding cross-head which is operated by eccentrics mounted on the power-shaft, said driving-rods being provided with driving-pins which pass through said driving-tubes, and by which the nails are driven through the hoops and staves, said forms being composed of circular heads having spacing ribs or flanges between which the staves are placed, and being also provided with annular grooves into which the nails are driven, and the shaft on which said heads are placed, being adapted to receive a disk or plate which constitutes the bottom of the basket, and into which nails are also driven, and means connected with the power-shaft for holding said staves into position on said forms, while the nails are being driven through the hoops and staves, substantially as shown and described.

10. In a machine for making fruit-baskets, the combination with a suitable frame, of a form-carrier mounted therein, and provided with a plurality of forms which consist of circular heads of different diameters, which are mounted on a revoluble shaft, a ratchet-wheel mounted on each of said shafts, and means connected therewith, for giving said shafts an intermittent revoluble motion, consisting of a ratchet bar or lever which is pivotally connected with a sliding cross-head which is connected with the power-shaft of the machine, by means of an eccentric, and devices connected with said frame for feeding or placing the staves in position on said forms, and also for placing the hoops in position, said machine being also provided with nail-hoppers, and means for feeding the nails from said hoppers into position to be driven through said hoops, and said staves, said nails being fed into driving-tubes, and devices connected with the power-shaft for driving said nails into position, substantially as shown and described.

11. In a machine for making fruit-baskets, the combination with a suitable frame, of a form-carrier mounted therein, and provided with a plurality of forms which consist of circular heads of different diameters, which are mounted on revoluble shafts, a ratchet-wheel mounted on each of said shafts, and means connected therewith, for giving said shafts an intermittent revoluble motion, consisting of a ratchet bar or lever which is pivotally connected with a sliding cross-head which is connected with the power-shaft of the machine, by means of an eccentric, and devices connected with said frame for feeding or placing the staves in position on said forms, and also for placing the hoops in position, said machine being also provided with nail-hoppers, and means for feeding the nails from said hoppers into position to be driven through said hoops, and said staves, said nails being fed into driving-tubes and devices connected with the power-shaft for driving said nails into position, consisting of eccentrics mounted on said power-shaft, which are connected with a sliding cross-head, and driving-rods also connected with said cross-head, and with the feeding-tubes into which the nails are fed, said driving-rods being provided with driving-pins which are adapted to be driven into or through said driving-tubes, substantially as shown and described.

12. In a machine for making fruit-baskets, the combination with a suitable frame, of a form-carrier mounted therein, and provided with a plurality of forms each consisting of circular heads of different diameters, mounted on a revoluble shaft, a ratchet-wheel on said shaft, and means connected therewith, for giving said shaft an intermittent revoluble motion, consisting of a ratchet bar or lever which is pivotally connected with a sliding cross-head which is connected with the power-shaft of the machine, by means of an eccentric, and devices connected with said frame for feeding or placing the staves in position on said forms, and also for placing the hoops in position, said machine being also provided with nail-hoppers, and means for feeding the nails from said hoppers into position, to be driven through said hoops, and said staves, said nails being fed into driving-tubes and devices connected with the power-shaft for driving said nails into position consisting of eccentrics mounted on said power-shaft, which are connected with a sliding cross-head, and driving-rods also connected with said cross-head, and with the feeding-tubes into which the nails are fed, said driving-rods being provided with driving-pins which are adapted to be driven into or through said driving-tubes, said driving-rods being spring-operated, and means connected with the power-shaft for holding the staves in position on said forms, substantially as shown and described.

13. In a machine for making baskets, the combination with a suitable frame, of vertically-revoluble forms which are mounted on a revoluble carrier, devices for giving said forms an intermittent revoluble motion, a suitable stave-hopper also mounted on said frame, and capable of vertical intermittent movement, pickers and other devices for removing the staves from the hopper, and depositing them on the forms, feeding-tubes through which the hoops are passed, which terminate adjacent to said forms, nail-hoppers suitably supported on said frame, and in operative connection with the power-shaft of the machine, and provided with devices whereby they are given a lateral or oscillating motion, chutes connected with said hoppers, through which the nails are fed, and provided with extensions, each of which is provided with a slot in the bottom thereof, means for feeding the nails successively from said slots into other chutes, which are provided with tubes which communicate with driving-tubes, and suitable driving devices connected with the power-shaft of the machine, and with a sliding cross-head whereby the nails are driven through said driving-tubes into and through said hoops and staves, substantially as shown and described.

14. In a machine for making baskets, the combination with a suitable frame, of vertically-revoluble forms which are mounted on a revoluble carrier, devices for giving said forms an intermittent revoluble motion, a suitable stave-hopper also mounted on said frame, and capable of vertical intermittent movement, pickers and other devices for removing the staves from the hopper, and depositing them on the forms, feeding-tubes through which the hoops are passed, which terminate adjacent to said forms, nail-hoppers suitably supported on said frame, and in operative connection with the power-shaft of the machine, and provided with devices whereby they are given a lateral or oscillating motion, chutes connected with said hoppers, through which the nails are fed, and provided with extensions, each of which is provided with a slot in the bottom thereof, means for feeding the nails successively from said slots into other chutes, which are provided with tubes which communicate with driving-tubes, and suitable driving devices connected with the power-shaft of the machine, and with a sliding cross-head whereby the nails are driven through said driving-tubes into and through said hoops and staves, said driving devices consisting of driving-rods which are connected with a sliding cross-head, and of eccentrics connected with the power-shaft, and with said cross-head, said driving-rods being provided with driving-pins, which extend into and through said driving-tubes, substantially as shown and described.

15. In a machine for making baskets, the combination with a suitable frame, of revoluble forms which are mounted on a revoluble carrier, devices for giving said forms an intermittent revoluble motion, a suitable stave-hopper also mounted on said frame, and capable of vertical intermittent movement, pickers and other devices for removing the staves from the hopper and depositing them on the forms, feeding-tubes through which the hoops are passed, which terminate adjacent to said forms, nail-hoppers suitably supported on said frame, and in operative connection with the power-shaft of the machine, and provided with devices whereby they are given a lateral or oscillating motion, chutes connected with said hoppers, through which the nails are fed, and provided with extensions, each of which is provided with a slot in the bottom thereof, means for feeding the nails successively from said slots into other chutes, which are provided with tubes which communicate with driving-tubes, and suitable driving devices connected with the power-shaft of the machine, and with a sliding cross-head whereby the nails are driven through said driving-tubes into and through said hoops and staves, said driving devices consisting of driving-rods which are connected with a sliding cross-head, and of eccentrics connected with the power-shaft, and with said cross-head, said driving-rods being provided with driving-pins, which extend into and through said driving-tubes, and devices connected with the power-shaft for holding the staves in position on the forms, while the nails are being driven, and said forms being also adapted to receive a disk or plate which constitutes the bottom of the basket, and into which nails are also driven through the hoops and staves, substantially as shown and described.

16. In a machine for making baskets, the combination with a suitable frame, of a revoluble form-carrier, said form-carrier being provided with revoluble spindles or rods, on which are mounted circular heads which constitute the form proper, said circular heads being provided with flanges or ribs by which the staves of the basket are spaced, and with annular grooves formed therein, and each of said spindles being also provided with a ratchet-wheel, and means connected therewith for giving the same an intermittent revoluble motion, suitable means for feeding staves into position on said forms, and for holding them thereon, while being nailed, hoop-tubes through which hoops are passed into position to be nailed onto said staves, nail-hoppers suitably mounted upon said frame, and provided with means for feeding the nails into position to be driven into said hoops and staves, spring-operated driving-rods which pass through suitable keepers, and into driving-tubes into which the nails are fed, said driving-rods being connected with a sliding cross-head, which is in operative connection with eccentrics mounted on the power-shaft, substantially as shown and described.

17. A machine for making baskets comprising a frame, a form-carrier connected therewith, forms connected with said carrier, devices for giving said carrier intermittent motion, a stave-hopper mounted on said frame, and devices connected therewith for placing the staves upon the respective forms, tubes adjacent to said stave-hopper through which the hoops are passed, nail-hoppers which are suitably mounted and provided with means for giving the same a lateral and oscillating motion, devices for feeding the nails into position to be driven into said hoops and staves, and drivers by which the nails are driven into said hoops and staves, said drivers consisting of a sliding cross-head, which is connected by means of eccentrics with the power-shaft of the machine, and driving-rods connected with said cross-head, said nails being fed from said hoppers into a tube which is connected with said driving-rods, and through which passes a driving-pin, substantially as shown and described.

18. A machine for making baskets comprising a suitable frame, a form-carrier connected therewith, forms connected therewith, a stave-hopper also mounted on said frame, and devices connected therewith for placing the staves on the respective forms, hoop-tubes adjacent to said stave-hopper through which the hoops are passed, nail-hoppers which are suitably mounted on said frame, and provided with means for giving the same an oscillating or lateral motion, devices for feeding the nails into position to be driven into said hoops and staves, and drivers by which the nails are driven into said hoops and staves, consisting of a sliding cross-head which is connected by means of eccentrics with the power-shaft of the machine, and driving-rods connected with said cross-head, said nails being fed into a tube which is connected with said driving-rods, and through which passes a driving-pin, and devices for operating the form-carrier and revolving the same as each stave is placed in position, substantially as shown and described.

19. A machine for making baskets, comprising a frame, a form-support carried by said frame, a plurality of forms connected with said support, means for placing staves and hoops in position upon the respective forms, mechanism for applying securing devices to the staves and hoops, and mechanism operating to throw one form into operative position with relation to said securing devices as the other form is withdrawn from said operative position, substantially as and for the purpose set forth.

20. A machine for making baskets, comprising a frame, a form-support carried by said frame, a revoluble form connected with said support, and means for moving said support to and from the stave and hoop applying and nailing mechanism, in combination with means for placing said staves and hoops upon the form, mechanism for feeding nails into position with relation to the staves and hoops when the same are upon the revoluble form, and driving devices operating with respect to the action of the nail-feeding mechanism to drive said nails through the staves and hoops when the same are carried into a relative position by the movement of the revoluble form, substantially as and for the purpose set forth.

In testimony that I claim the foregoing as my invention I have signed my name, in presence of the subscribing witnesses, this 2d day of June, 1896.

WARREN RENSALAER VAN VLIET.

Witnesses:
HARNER HOFFMAN,
B. F. MILLER.